United States Patent
Kurusu et al.

(10) Patent No.: US 7,898,778 B2
(45) Date of Patent: Mar. 1, 2011

(54) SUPERCONDUCTING COIL QUENCH DETECTION METHOD AND DEVICE, AND SUPERCONDUCTING POWER STORAGE UNIT

(75) Inventors: Tsutomu Kurusu, Kanagawa (JP); Michitaka Ono, Kanagawa (JP); Taizo Tosaka, Kanagawa (JP); Yusuke Ishii, Kanagawa (JP); Yasuhiro Yamashita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 566 days.

(21) Appl. No.: 11/918,673

(22) PCT Filed: Apr. 18, 2006

(86) PCT No.: PCT/JP2006/308141
§ 371 (c)(1),
(2), (4) Date: Mar. 28, 2008

(87) PCT Pub. No.: WO2006/115126
PCT Pub. Date: Nov. 2, 2006

(65) Prior Publication Data
US 2009/0046399 A1   Feb. 19, 2009

(30) Foreign Application Priority Data
Apr. 19, 2005   (JP) .................................. 2005-121104

(51) Int. Cl.
*H02H 7/00* (2006.01)

(52) U.S. Cl. .......................................................... 361/19
(58) Field of Classification Search ...................... 361/19
See application file for complete search history.

(56) References Cited

U.S. PATENT DOCUMENTS

| | | | | |
|---|---|---|---|---|
| 4,978,922 A | * | 12/1990 | Mallick et al. | 324/652 |
| 4,996,472 A | * | 2/1991 | Mallick, Jr. | 324/71.6 |
| 5,067,044 A | | 11/1991 | Mallick, Jr. et al. | |
| 6,107,905 A | * | 8/2000 | Itoh et al. | 335/216 |

FOREIGN PATENT DOCUMENTS

| JP | 60-182109 A | 9/1985 |
|---|---|---|
| JP | 61-289611 A | 12/1986 |
| JP | 63-003405 A | 1/1988 |
| JP | 01-262606 A | 10/1989 |
| JP | 4-220518 | 8/1992 |
| JP | 5-316633 A | 11/1993 |
| JP | 6-333739 A | 12/1994 |
| JP | 8-138927 A | 5/1996 |
| JP | 9-084252 A | 3/1997 |
| JP | 9-260130 A | 10/1997 |

* cited by examiner

*Primary Examiner* — Stephen W Jackson
(74) *Attorney, Agent, or Firm* — Foley & Lardner LLP

(57) ABSTRACT

A superconducting coil quench detection method and device capable of detecting a quench detection voltage even in a superconducting coil where a plurality of element coils are connected with a plurality of current sources and operated with repetitive pulses or AC and a voltage of several kV is applied continuously as an induction voltage. A super conducting power storage unit is also provided.

8 Claims, 10 Drawing Sheets

(a)

(b)

(a)

(b)

(a)

(b)

(a)

(b)

(a)

(b)

(a)

(b)

(a)

(b)

(a)

(b)

SUPERCONDUCTING COIL QUENCH DETECTION METHOD AND DEVICE, AND SUPERCONDUCTING POWER STORAGE UNIT

TECHNICAL FIELD

The present invention relates to a method and a device for detecting a quench in a superconducting coil, particularly in a superconducting coil in which an induction voltage is continuously generated. Such a superconducting coil may include one for power system control or one for compensating momentary voltage drop. Also, the present invention relates to a superconducting power storage device.

BACKGROUND ART

When a superconducting coil quenches upon electrification and changes from a superconducting state to a normal conductive state, the superconducting coil is damaged if the electrification state is continued. Therefore, it is necessary to stop the electrification by detecting generation of the quenching at an early stage (refer to Patent Documents 1 and 2).

In the superconducting coil electrified by a current source, the simplest quench detection method is a method for monitoring an absolute value of a voltage between both ends of the superconducting coil. This method detects a change of an output voltage of the current source along with generation of resistance in the superconducting coil. Although this method is simple, it is necessary to set a detecting voltage so as not to erroneously detect an induction voltage at the time of magnetization and demagnetization of the superconducting coil. Therefore, in many cases, the method is applied to a small superconducting coil in which a magnetization voltage is around several volts, and at the same time, the detecting voltage can be set to be several volts or more. In general, both ends of the superconducting coil are shorted by a semiconductor element and resistance for protection. Therefore, the maximum voltage input to a quench detection device is determined by the voltage between both ends of the resistance and the semiconductor element.

A method widely used in a case where the detecting voltage at the time of the quenching desires to be set small in comparison with the induction voltage at the time of the magnetization and the demagnetization of the superconducting coil is a method for monitoring a voltage difference between both sections obtained by dividing the superconducting coil. In a case where the superconducting coil is configured with a plurality of element coils, the superconducting coil may be divided at the middle point of the element coil group. In this method, a voltage difference between two sections obtained by equally dividing an inductance is monitored. Thus, generation of a minute abnormal voltage can be detected by canceling the induction voltage. In practical use, a difference in the inductance between each divided section needs to be finely adjusted on a quench detection device side for compensation. In general, there is an aspect that the detection becomes harder as a difference between the detecting voltage and the induction voltage becomes larger. In addition, there is a case where a voltage at the middle point of the superconducting coil becomes higher than the voltage at both ends of the coil. Therefore, in view of avoiding an excess voltage, there generally is a case where a protective circuit that refluxes a coil current for each section obtained by dividing at the middle point is configured, and the resistance and the semiconductor element are included in each circuit to control the maximum voltage.

As an example of detecting the quenching by a signal other than a coil voltage, there is known a method of monitoring a pressure change of a cooling medium in a case of the superconducting coil using a force-cooled conductor. Although this method can resolve many problems in a case of detection by the coil voltage, it is difficult to apply the method to the superconducting coil which is immersion-cooled in the cooling medium.

On the other hand, as a technique to cancel an induction component of the coil voltage, there is known a method of measuring the induction component of the coil voltage by a pick-up coil, and the measured induction component is subtracted from the coil voltage being electrified (refer to Patent Document 3). There also is a case where the induction component of the coil voltage is directly calculated from a current signal without using the pick-up coil. Although these methods are mainly applied to an AC loss measurement of the superconducting coil, the methods may be applied to the quench detection.

It is also known that, in a case where reinforcing metal which is electrically insulated from a coil conductor is wound together with the coil conductor in order to improve rigidity of the superconducting coil, the reinforcing metal can be used as the pick-up coil. In this case, an inductance of the pick-up coil excellently matches with an inductance of the superconducting coil, and then, an ideal pick-up coil is obtained (refer to Patent Document 4).

Patent Document 1: Japanese Patent Application Laid-Open Publication No. Hei 6-333739
Patent Document 2: Japanese Patent Application Laid-Open Publication No. Hei 9-260130
Patent Document 3: Japanese Patent Application Publication No. Hei 5-58246
Patent Document 4: Japanese Patent Application Publication No. Hei 6-56811

DISCLOSURE OF THE INVENTION

Problem to be Solved by the Invention

In recent years, it has been considered that a superconducting coil used for power storage and so on is operated in a manner that a plurality of element coils having comparatively large size are connected to a plurality of current sources and repeated pulse operation or AC operation is carried out. In these cases, an induction voltage exceeds several kilovolts and at the same time a voltage generated on both ends of a resistance included in a protective circuit exceeds several kilovolts in many cases. A withstand voltage of equipment is generally set to be large enough with respect to a voltage actually applied. Therefore, a required withstand voltage may become several tens of kilovolts. On the other hand, a detecting voltage at the time of quenching is less than 1 volt in many cases. Therefore, quench detection needs to detect an abnormal voltage which is in a level of a ten-thousandth of the induction voltage, and at the same time, have a withstand voltage of several tens of kilovolts. In this case, there is a problem that sufficient sensitivity is difficult to secure as the detecting voltage becomes smaller, when a voltage signal is divided through a resistance and input in an insulating amplifier for a high voltage as in general high-voltage measurement.

In addition, when the element coils operated by different power sources are located close to each other and each power source is not operated in synchronism with one another, it is necessary to cancel mutual induction from the element coils operated by different power sources. Further, there is a case where voltage sharing is different between the element coils due to potential oscillation. Therefore, there is a case where it is difficult to cancel the induction voltage completely in a conventional method of monitoring a voltage difference. In this case, since the element coils are operated with a setting value of the detecting voltage increased to some extent in order to avoid false determination of quenching, there is a problem that a minute voltage cannot be detected.

A method of retrieving a resistance component by canceling an induction component of a coil voltage by using a pick-up coil and so on seems to be advantageous for the detection of the abnormal voltage since a voltage input to a quench detector in a normal condition is at zero level. However, since this method directly reads the generated resistance component, there is a case where a withstand voltage required for an inputting part of the detector becomes several tens of kilovolts or more in a case quenching has progressed sufficiently. In order to correspond with the above case, if a configuration is such that the detecting voltage is divided through resistance and measured by using an insulating amplifier for a high voltage, an advantageous effect of canceling the induction component is eliminated. Therefore, there is a problem that, as described above, it becomes difficult to secure sufficient sensitivity as the detecting voltage becomes smaller.

In view of the above, an object of the present invention is to provide a quench detection method and device capable of detecting the detecting voltage at the time of quenching also in the superconducting coil which is operated in the repeated pulse operation or the AC operation with a plurality of the element coils being connected to a plurality of current sources, and to which several kilovolts are applied continuously as the induction voltage, and a superconducting power storage device.

Means for Solving the Problem

According to the present invention, a quench detection device for a superconducting coil is characterized by comprising: a pick-up coil provided inside or in the vicinity of the superconducting coil; an excess voltage protective circuit that outputs a voltage signal of a predetermined value or smaller after a voltage of a difference between a voltage generated in the superconducting coil and a voltage induced to the pick-up coil is input at the time the superconducting coil quenches; and a quench detector that detects quenching of the superconducting coil after the voltage signal is input to the quench detector.

According to the present invention, a quench detection method of a superconducting coil that detects generation of a resistance component in the superconducting coil by measuring a voltage obtained by canceling an induction component from a voltage generated in the superconducting coil is characterized by comprising: carrying out excess voltage protection so that a maximum value of the voltage to be measured does not exceed a predetermined voltage.

According to the present invention, a superconducting power storage device having a quench detection device of a superconducting coil is characterized by comprising: a pick-up coil provided inside or in the vicinity of the superconducting coil; an excess voltage protective circuit that outputs a voltage signal of a predetermined value or smaller after a voltage of a difference between a voltage generated in the superconducting coil and a voltage induced to the pick-up coil is input at the time the superconducting coil quenches; and a quench detector that detects quenching of the superconducting coil after the voltage signal is input to the quench detector.

ADVANTAGE OF THE INVENTION

According to the present invention, a detecting voltage at the time of quenching can be detected also in a superconducting coil which is operated in repeated pulse operation or AC operation with a plurality of element coils being connected to a plurality of current sources, and to which several kilovolts are applied continuously as an induction voltage.

EXPLANATION OF REFERENCE SYMBOLS

Figure 1:
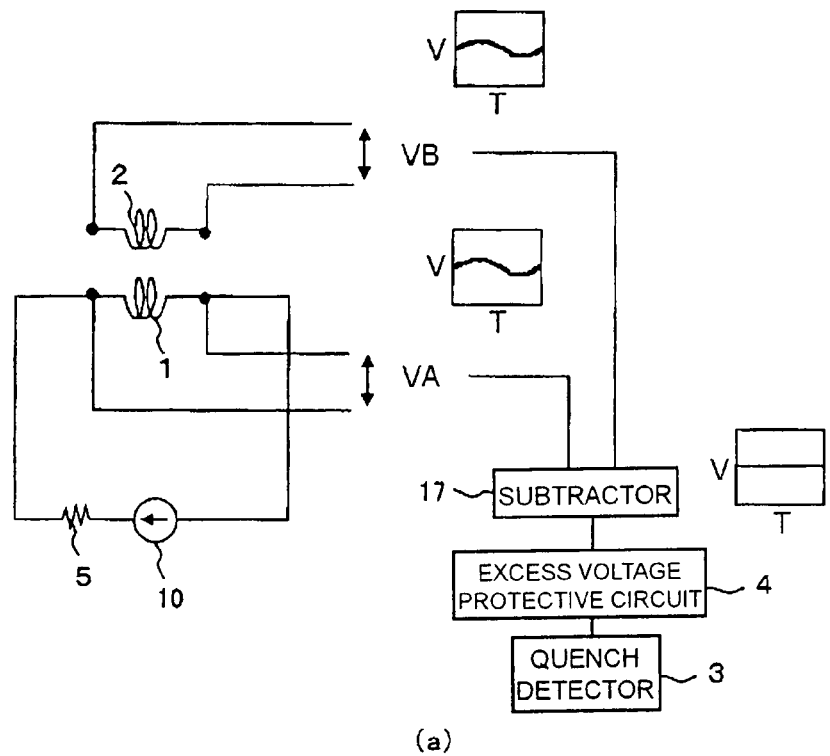
FIG. 1 (a) is a circuit diagram showing a quench detection device of a superconducting coil according to a first embodiment of the present invention, and (b) is a circuit diagram of a modification of (a)
Figure 1:
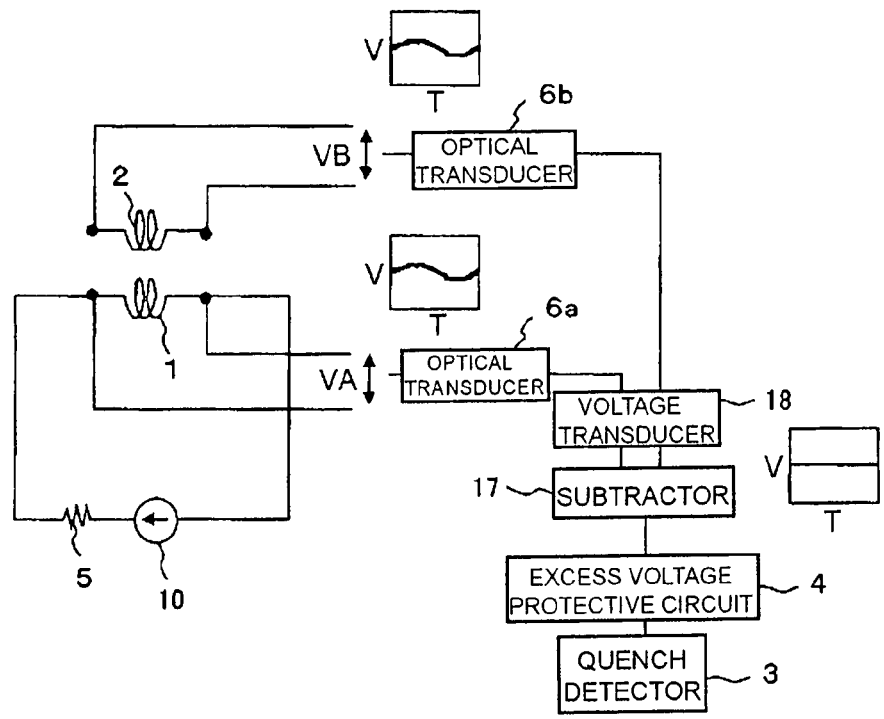

1: superconducting coil
2: pick-up coil
3: quench detector
4: excess voltage protective circuit
5: current-limiting resistor
6a, 6b: optical transducer
7: superconducting wire
8: sub-conductor
9: element coil
10: current source 11: semiconductor element
12: cryostat
13: diode
14: thyristor
15: resistor
16: superconducting power storage device
17: subtractor
18: voltage transducer
20: insulating coating

BEST MODE FOR CARRYING OUT THE INVENTION

Hereinafter, first to tenth embodiments of a quench detection method of a superconducting coil and a device thereof according to the present invention will be described with reference to the accompanying drawings.

First Embodiment

FIG. 1 (a) is a circuit diagram showing the first embodiment of the present invention. A quench detection device according to the present embodiment includes a pick-up coil 2 provided in the vicinity of a superconducting coil 1 connected to a current source 10 via a current-limiting resistor 5, a subtractor 17 in which a voltage VA between terminals of the superconducting coil 1 and a voltage VB between terminals of the pick-up coil 2 are input, an excess voltage protective circuit 4 connected to the subtractor 17, and a quench detector 3 connected to the excess voltage protective circuit 4.

In the present embodiment, the pick-up coil 2 is allocated at a position where a magnetic field generated by the superconducting coil 1 can be sensed. Then, a voltage obtained by eliminating an induction component at the subtractor 17 from an magnetization and demagnetization voltage of the superconducting coil 1 is input to the quench detector 3 after the voltage is passed through the excess voltage protective circuit 4. The excess voltage protective circuit 4 shorts between input signals when the input voltage reaches to a threshold value. In this manner, an excessive voltage is prevented from being applied to the quench detector 3, thereby the quench detector 3 is protected. The threshold value is selected to an extent below 600 V, for example. At the elimination of the induction voltage, operation of multiplying a signal of the pick-up coil 2 by a constant may be carried out, or the induction component may be calculated from a current signal of the current-limiting resistor 5 without using the pick-up coil 2. In these cases, conditions of the operation and the calculation are selected after checking each output obtained by trial electrification of the superconducting coil 1 carried out with a current value smaller than a rating.

In the figures, a graph showing a relationship between a voltage V and time T at each position on the circuit is shown as well. In FIG. 1 (a), a case of AC electrification with a sine wave is shown. However, the current waveform may be optional. In addition, there is a case where a signal input to the quench detector 3 has potential of 600 V or higher with respect to the ground. Therefore, the quench detector 3 may be not earthed to keep potential floating, or may be made to have a high withstand voltage with respect to the ground.

As a modification, as shown in FIG. 1 (b), the configuration may be such that a voltage signal is converted to an optical signal by an optical transducers 6a and 6b and transmitted, and thereafter the optical signal is converted to the voltage signal again by a voltage transducer 18 and is input to the excess voltage protective circuit 4. In this case, the optical transducers 6a and 6b that converts the voltage signal to the optical signal may not be earthed to the ground to keep potential floating, or may be made to have a high withstand voltage with respect to the ground.

A protective voltage of the excess voltage protective circuit 4 is set to be below 600 V because it is desirable that the device is within a range of low voltage operation. It is further desirable if the protective voltage is set to be below 200 V that is generally set as a maximum input voltage of a measurement instrument.

In a case where quenching is detected by the quench detector 3, stopping operation is carried out to stop electrification of the superconducting coil 1 at an early stage. More specifically, a current source 10 is cut, and switching over is carried out so as to flow a current in a protective resistor (not shown) parallel to the current source 10.

In the present embodiment, the voltage signal at zero level obtained by canceling the induction component is input to the quench detector 3 without making a signal to be small by dividing the signal through resistance and so on, and simultaneously a maximum applied voltage is made to be within a range of a low voltage by applying excess voltage protection. In this manner, an insulating amplifier for a high voltage becomes unnecessary on a detector side, and it is possible to detect an abnormal voltage of less than 1 V with high accuracy. Therefore, it is possible to avoid a problem that sufficient detection sensitivity is hard to obtain with respect to the abnormal voltage of less than 1 V in a case of using the insulating amplifier for a high voltage.

Second Embodiment

Figure 2:
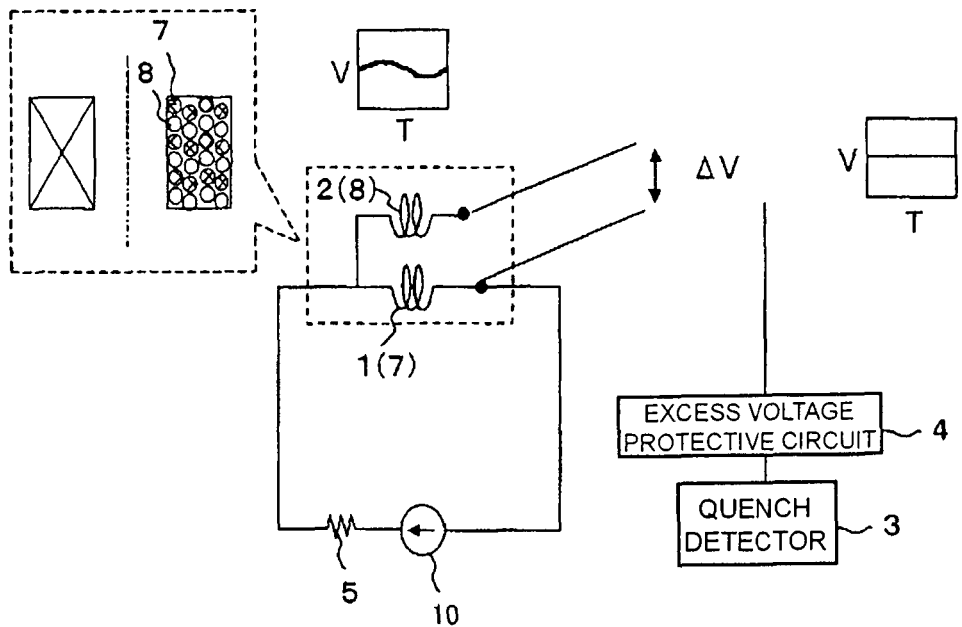
FIG. 2 (a) is a circuit diagram showing the quench detection device of the superconducting coil according to a second embodiment of the present invention, and (b) is a circuit diagram of a modification of (a)
Figure 2:
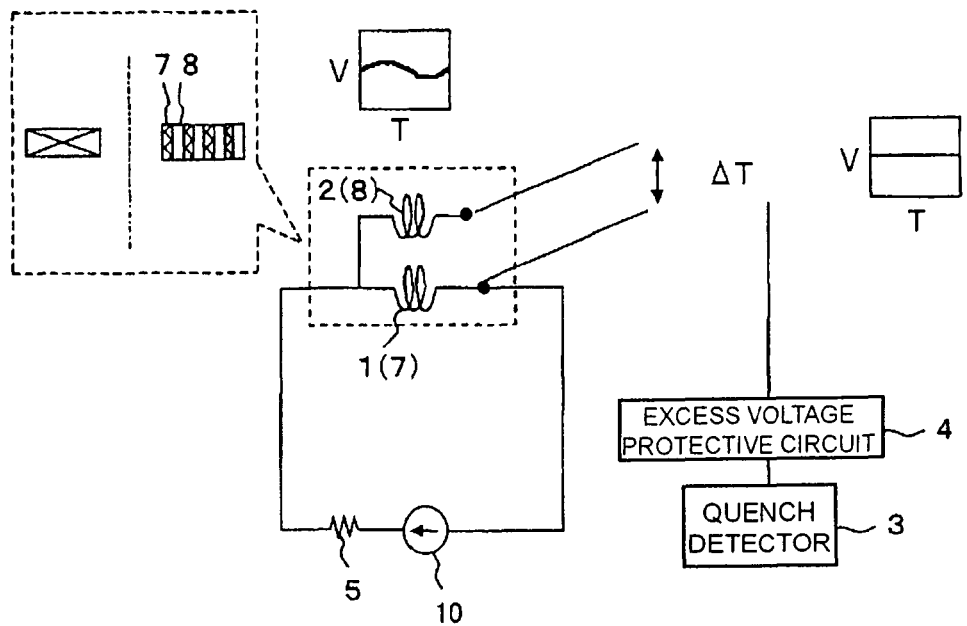

FIG. 2 is a configuration diagram of a second embodiment of the quench detecting method of the superconducting coil and the method thereof according to the present invention.

Here, a figure surrounded by a dotted line at an upper-left corner of each of FIGS. 2 (a) and 2 (b) shows a cross-sectional shape when the superconducting coil 1 and the pick-up coil 2 are configured by combining a superconducting wire 7 and a sub-conductor 8. As shown in these figures, the superconducting wire 7 and the sub-conductor 8 are wound together to configure the superconducting coil 1 and the pick-up coil 2. However, in these figures, a detailed cross sectional shape of the left half is omitted.

The sub-conductor 8 works as the pick-up coil 2. Although the superconducting wire 7 and the sub-conductor 8 are electrically insulated from each other, the wire 7 and the sub-conductor 8 are electrically connected at one part, and the superconducting wire 7 and the sub-conductor 8 have equal potential at the connection part. The superconducting wire 7 may be a bundled wire that bundles a plurality of the superconducting wires, or may be a twisted wire. In addition, a shape and a material of the sub-conductor 8 are not limited, and may have the same shape as the superconducting wire 7, or may have a shape so that the sub-conductor 8 covers a periphery of the superconducting wire 7. Alternatively, the sub-conductor 8 may be the superconducting wire that is different from the superconducting wire 7. At an edge part on the opposite side of the side where the superconducting wire 7 and the sub-conductor 8 have the equal potential, a voltage (voltage difference) ΔV between the superconducting wire 7 and the sub-conductor 8 is measured. In this manner, the induction voltage of the superconducting coil 1 is canceled and the obtained voltage signal is considered as the input signal to the quench detector 3.

In the above description, the superconducting wire 7 and the sub-conductor 8 have the same potential at one part. However, in a case where the superconducting coil 1 is configured with a plurality of element coils and have a plurality of independent electrical circuits, the superconducting wire 7 and the sub-conductor 8 may be connected for each of the independent circuits. Alternatively, the superconducting wire 7 and the sub-conductor 8 may be completely electrically insulated, and a voltage of each of the wire 7 and the sub-conductor 8 may be detected individually and the induction voltage may be subtracted on a quench detector 3 side.

In the present embodiment, the sub-conductor 8 wound in a coil shape together with the superconducting wire 7 is provided as the pick-up coil 2 for canceling the induction component of a coil voltage. Thereby, the induction voltage and a potential oscillation effect of the pick-up coil 2 excellently match with those of the superconducting coil 1, and the induction voltage can be cancelled in an excellent manner even in a case where potential oscillation is significant. Therefore, the detecting voltage of quenching can be set to be small, and the quench detection device with high accuracy can be achieved.

Third Embodiment

Figure 3:
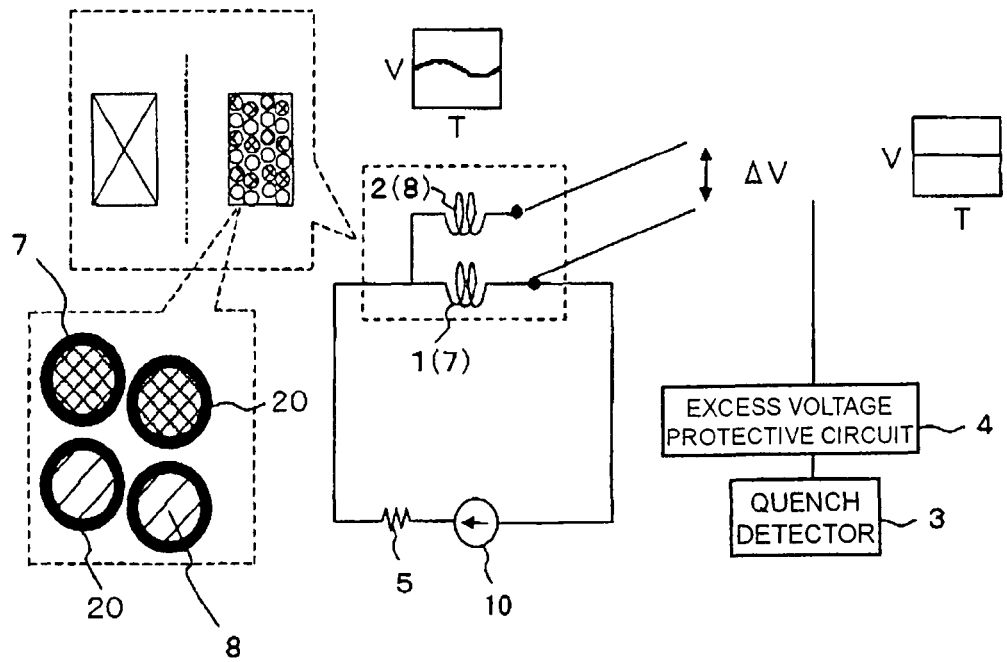
FIG. 3 (a) is a circuit diagram showing the quench detection device of the superconducting coil according to a third embodiment of the present invention, and (b) is a circuit diagram of a modification of (a)
Figure 3:
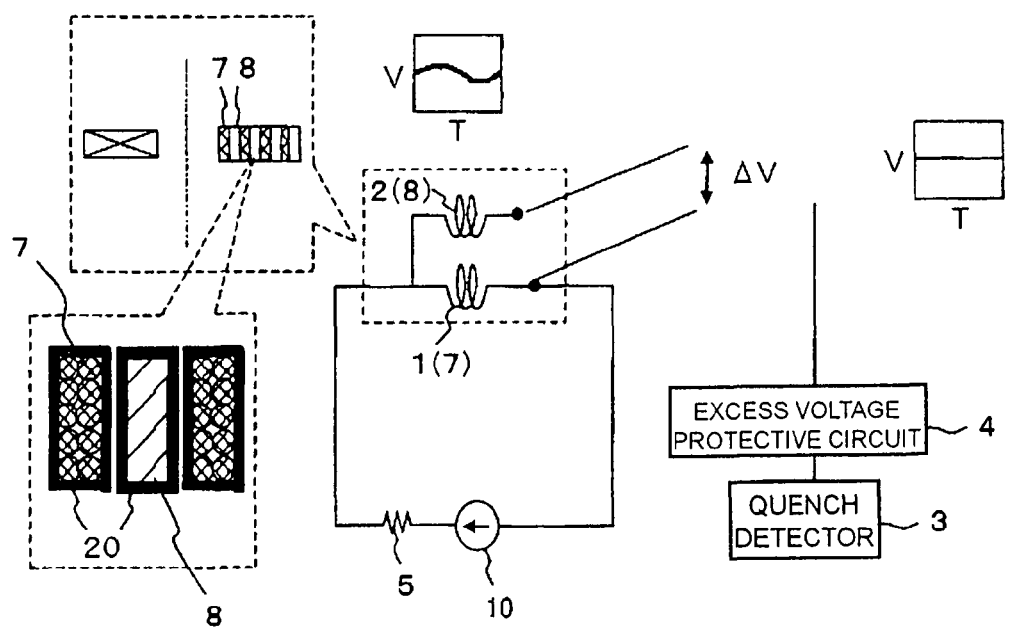

FIG. 3 is a configuration diagram showing a third embodiment of the present invention.

Here, a figure surrounded by a dotted line at an upper-left corner in each of FIGS. 3 (*a*) and 3 (*b*) shows a cross-sectional shape of the superconducting coil 1 and the pick-up coil 2 configured by combining the superconducting wire 7 and the sub-conductor 8, as similar to the case in FIGS. 2 (*a*) and 2 (*b*). As shown in these figures, the superconducting coil 1 and the pick-up coil 2 are configured by winding the superconducting wire 7 and the sub-conductor 8 together. Further, a figure surrounded by a dotted line at a lower-left corner of each of FIGS. 3 (*a*) and 3 (*b*) is a cross-sectional view enlarging and showing a part of the figure surrounded by the dotted line in the upper left corner.

In the present embodiment, the sub-conductor 8 that forms the pick-up coil 2 by being would together with the superconducting wire 7 that forms the superconducting coil 1 is configured with a member with high mechanical strength made of stainless steel, copper alloy, or aluminum alloy. As similar to the description in the second embodiment, a shape of the sub-conductor 8 can be chosen from a variety of shapes. As a means for electrically insulating the superconducting wire 7 and the sub-conductor 8 from each other, one or both of the superconducting wire 7 and the conductor 8 is covered by an insulating coating 20. As the insulating coating 20, an insulating material may be coated, or may be wound by an insulating tape or prepreg, and so on.

In the present embodiment, the sub-conductor 8 is a reinforcing material of the coil and also works as the pick-up coil 2. Therefore, the quench detection device with high accuracy can be achieved with efficiency and low cost.

Fourth Embodiment

Figure 4:
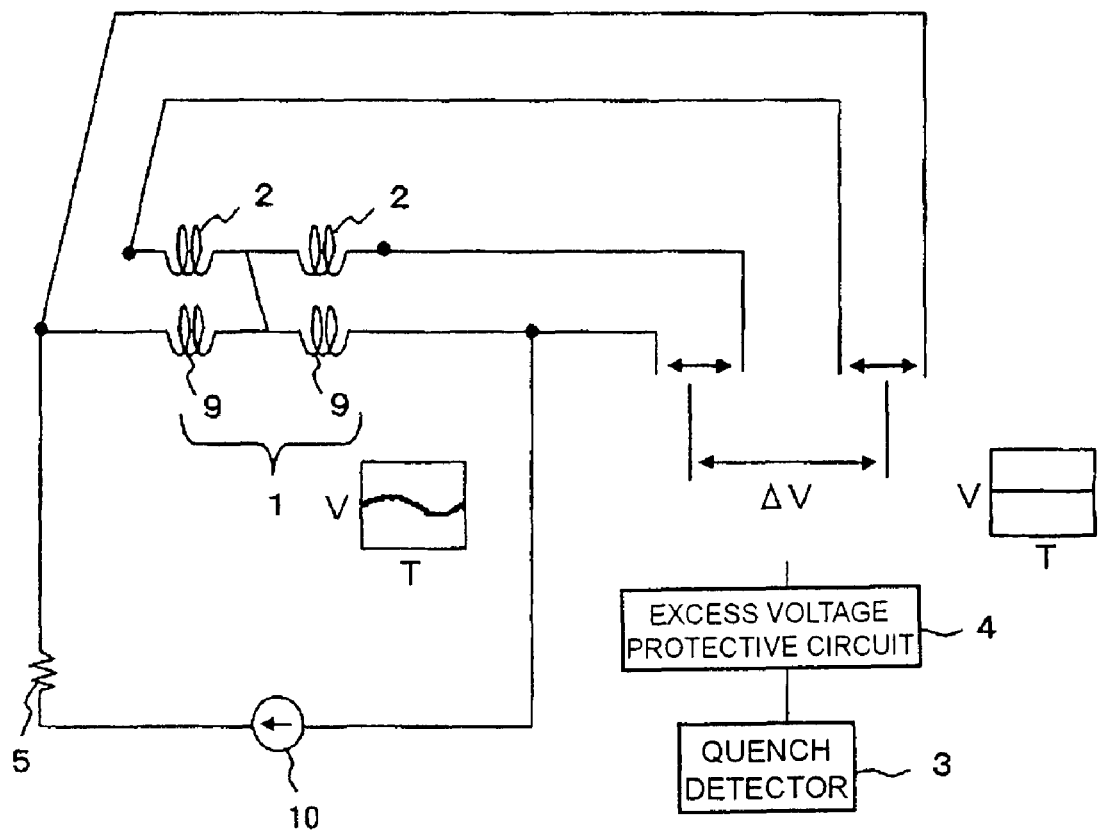
FIG. 4 is a circuit diagram showing the quench detection device of the superconducting coil according to a fourth embodiment of the present invention.

In the present embodiment, as shown in FIG. 4, the superconducting coil 1 is configured with two element coils 9 that are electrified in series by one current source 10. The number of element coils 9 is not limited to two, but may be three or more. In addition, the number of the current sources may be one or more, on condition that it is desirable that each power source is operated in synchronism with one another. Each of the element coils 9 has the coil configuration described in the third embodiment. A signal of the voltage ΔV obtained by canceling the induction voltage in each pair of the element coils 9 and the pick-up coil 2 is input in the quench detector 3, and a difference between the voltage signals is monitored.

As described above, the present embodiment measures the voltage obtained by canceling the induction component in each of the element coils 9 and monitors the voltage difference ΔV thereof. As a result, a problem that detecting sensitivity is not sufficiently maintained in a case where the minute induction voltage remained without being cancelled becomes larger than the quenching detecting voltage is avoided, and quench detection with high accuracy is achieved. In addition, in a case where the number of the element coils is large, it is possible to achieve the efficient quench detection device with the reduced number of the quench detectors.

Fifth Embodiment

Figure 5:
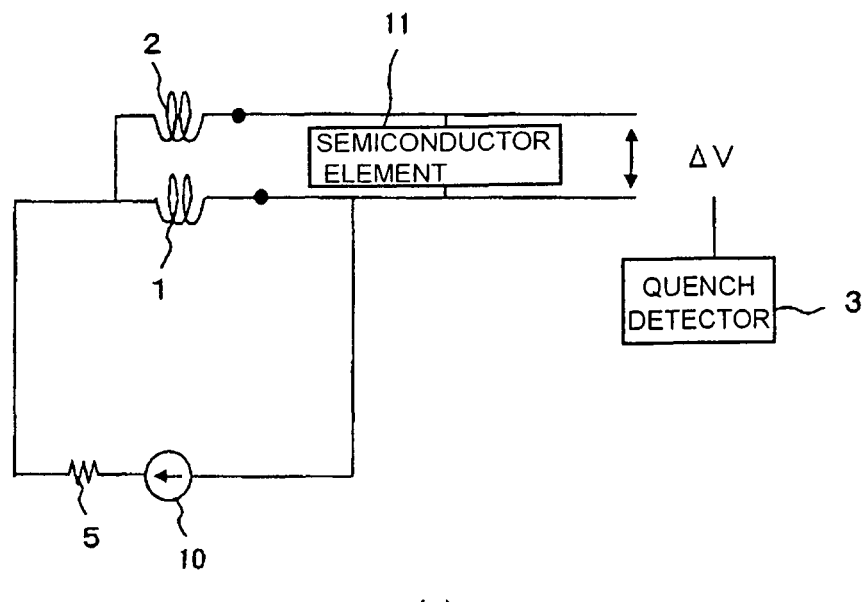
FIG. 5 (a) is a circuit diagram showing the quench detection device of the superconducting coil according to a fifth embodiment of the present invention, and (b) is a circuit diagram of a modification of (a)
Figure 5:
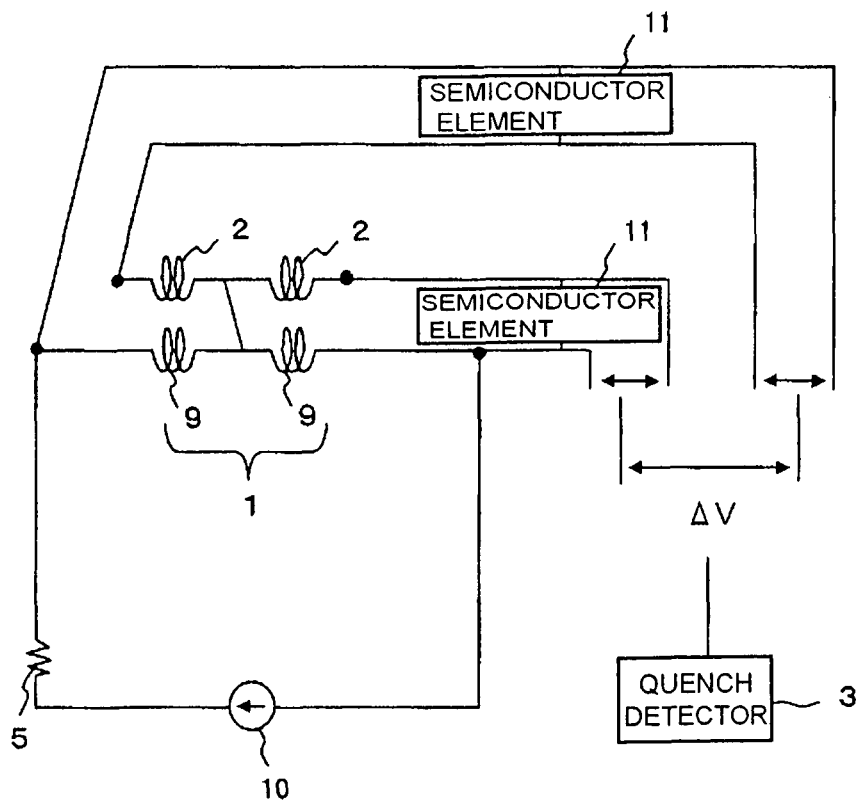

In the present embodiment, as shown in FIGS. 5 (*a*) and 5 (*b*), the superconducting wire 7 and the sub-conductor 8 are wound together to form the superconducting coil 1 and the pick-up coil 2. A semiconductor element (or semiconductor elements) 11 is (are) connected between the superconducting coil 1 and the pick-up coil(s) 2, and a voltage ΔV between both ends of the semiconductor element(s) 11 is (are) input in the quench detector 3 to monitor quenching. The semiconductor element(s) 11 is (are) normally in an open state, and the semiconductor element(s) 11 closes (close) when the superconducting coil 1 quenches and electrically shorts at a wire connection part (wire connection parts) of the superconducting coil 1 and the pick-up coil(s) 2. At this time, the semiconductor element(s) 11 has (have) been selected so that the voltage difference ΔV between the superconducting coil 1 and the pick-up coil(s) 2 does (do) not exceed 600 V.

In the present embodiment, a switch by the semiconductor element(s) 11 is (are) closed to short the voltage signal when quenching progresses and a resistance component of a voltage increases. In this manner, a maximum voltage input in the quench detector can be limited by the voltage at the both ends of the semiconductor element(s). Therefore, the insulating amplifier for high voltage does not need to be used, and it is possible to avoid a problem that detection of a minute voltage becomes difficult at the time of using the insulating amplifier for high voltage.

As described above, in the present embodiment, the semiconductor element(s) 11 is (are) connected to an input end (input ends) of a coil voltage signal (coil voltage signals) obtained by canceling the induction voltage. In this manner, the present embodiment can directly read the detecting voltage ΔV when quenching is determined, and can limit a maximum value of the detecting voltage ΔV by the voltages of the both ends of the semiconductor element(s) 11 in a forward direction after quenching progresses. Therefore, the quench detection device can be achieved without using the amplifier for high voltage.

Sixth Embodiment

Figure 6:
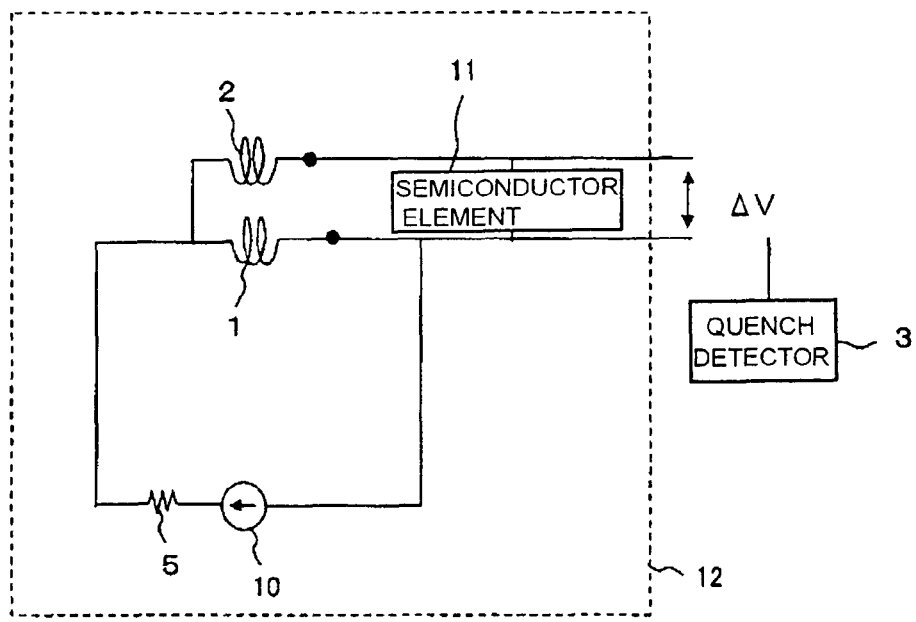
FIG. 6 (a) is a circuit diagram showing the quench detection device of the superconducting coil according to a sixth embodiment of the present invention, and (b) is a circuit diagram of a modification of (a)
Figure 6:
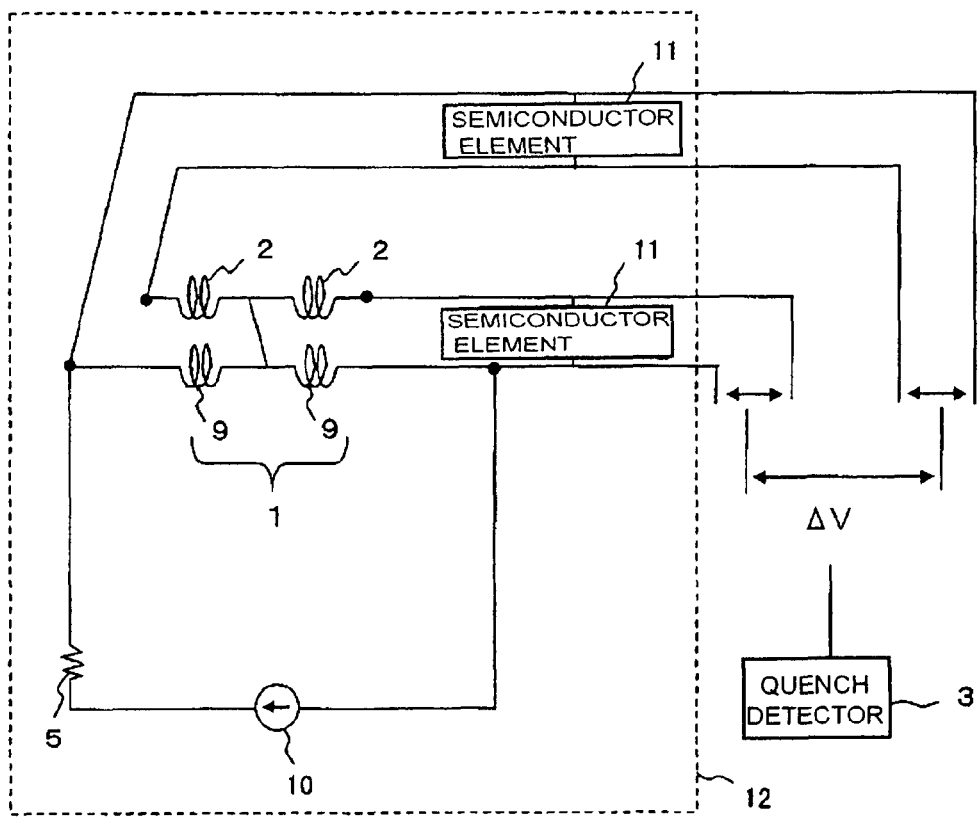

As shown in FIGS. 6 (*a*) and 6 (*b*), the present embodiment has a configuration same as the fifth embodiment (FIG. 5) except that the semiconductor element(s) 11 is (are) included in the inside of a cryostat 12 that contains the superconducting coil 1 and the pick-up coil(s) 2.

In FIG. 5, illustration of the cryostat 12 is omitted. However, the superconducting coil 1, the pick-up coil 2, the current-limiting resistor 5 and the current source 10 are included in the cryostat 12, and the semiconductor element(s) 11 is (are) allocated outside the cryostat 12.

The wire connection of the semiconductor element 11(*s*) needs (need) to have current capacity available for a current which flows (flow) when the semiconductor element(s) 11 is (are) closed. In the present embodiment, the semiconductor element(s) 11 is (are) included in the inside of the cryostat 12. Thus, a circuit (or circuits) of the current(s) which flows (flow) when the semiconductor element(s) 11 is (are) closed is (are) contained in the inside of the cryostat 12. Therefore, it is sufficient if signal lines for measuring are pulled out to the outside of the cryostat 12, and it is possible to avoid a problem that a thick electric cable having a large current-carrying capacity needs to be pulled out.

As described above, in the present embodiment, the semiconductor element(s) 11 is (are) included in the inside of the cryostat 12. Therefore, a compact superconducting coil device having thin signal lines for quenching detection which are pulled out to the outside of the cryostat 12 can be achieved, and similarly, a compact quench detection device can be achieved.

Seventh Embodiment

Figure 7:
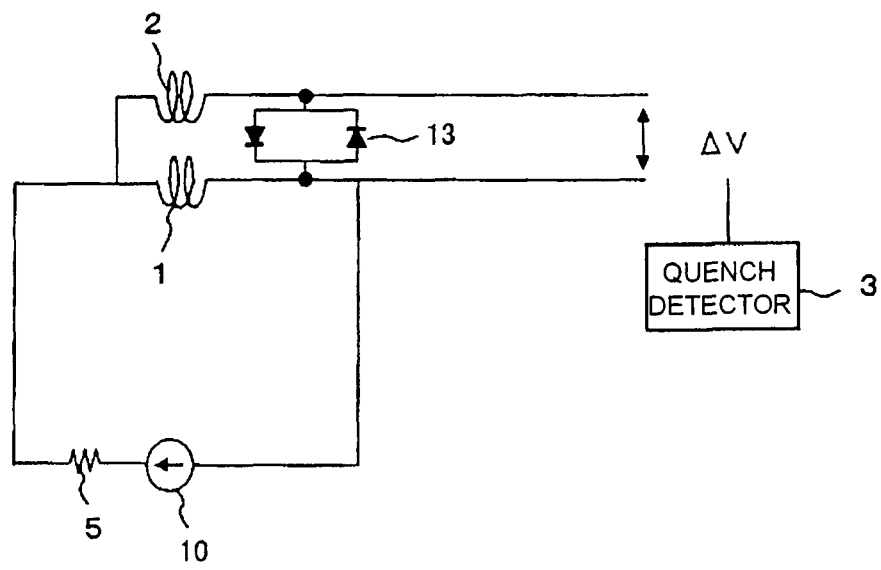
FIG. 7 (a) is a circuit diagram showing the quench detection device of the superconducting coil according to a seventh embodiment of the present invention, and (b) is a circuit diagram of a modification of (a)
Figure 7:
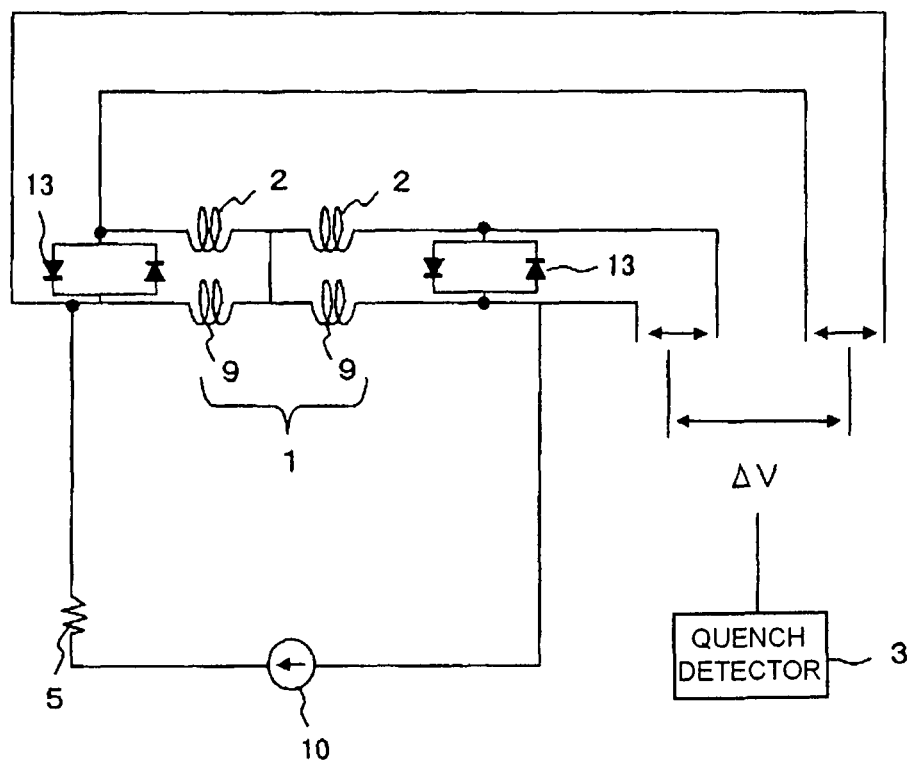

As shown in FIGS. 7 (*a*) and 7 (*b*), the present embodiment has a configuration in which diodes 13 are connected between terminals of the superconducting coil 1 and the pick-up coil (s) 2. The diodes 13 may be Zener diodes or surge absorbers. Alternatively, the diodes 13 may be replaced by elements such as varistors and arresters, or other switching elements that do not require control. In addition, by providing the diodes 13 in a thermal environment at a similar level with that of the superconducting coil 1, the diodes 13 may be used with a high forward voltage by taking advantage of temperature dependence of the forward voltage. Further, in order to adjust the forward voltage or the current capacity, a plurality of semiconductor elements may be configured in series or in parallel. In this case, elements of different kinds may be combined.

The present embodiment uses the diodes 13 that are semiconductor elements that do not need to be controlled from the outside to open or close. Therefore, in a case where the superconducting coil 1 quenches, it is possible to avoid a problem that reliability of opening and closing control of the semiconductor element is required.

As described above, the present embodiment uses the diodes that do not need to be controlled from the outside to open or close. In this manner, the quench detection device with high reliability that operates passively can be achieved.

Eighth Embodiment

Figure 8:
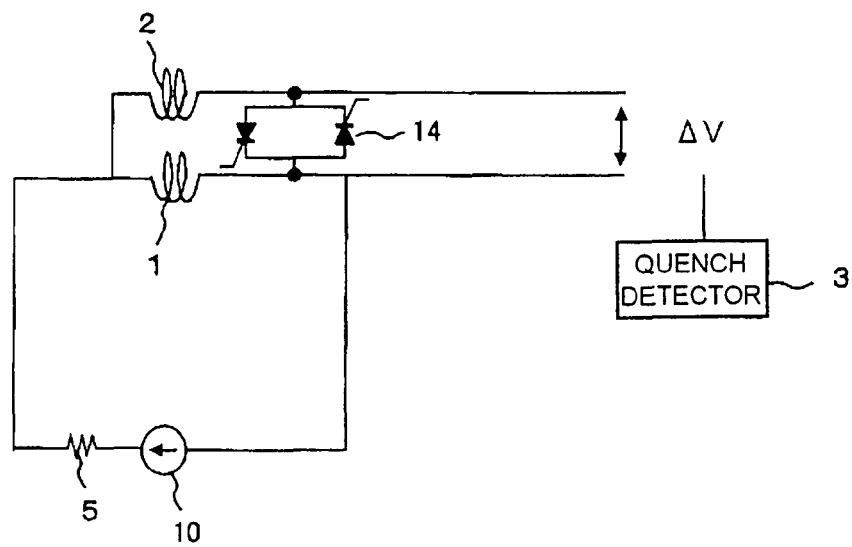
FIG. 8 (a) is a circuit diagram showing the quench detection device of the superconducting coil according to a eighth embodiment of the present invention, and (b) is a circuit diagram of a modification of (a)
Figure 8:
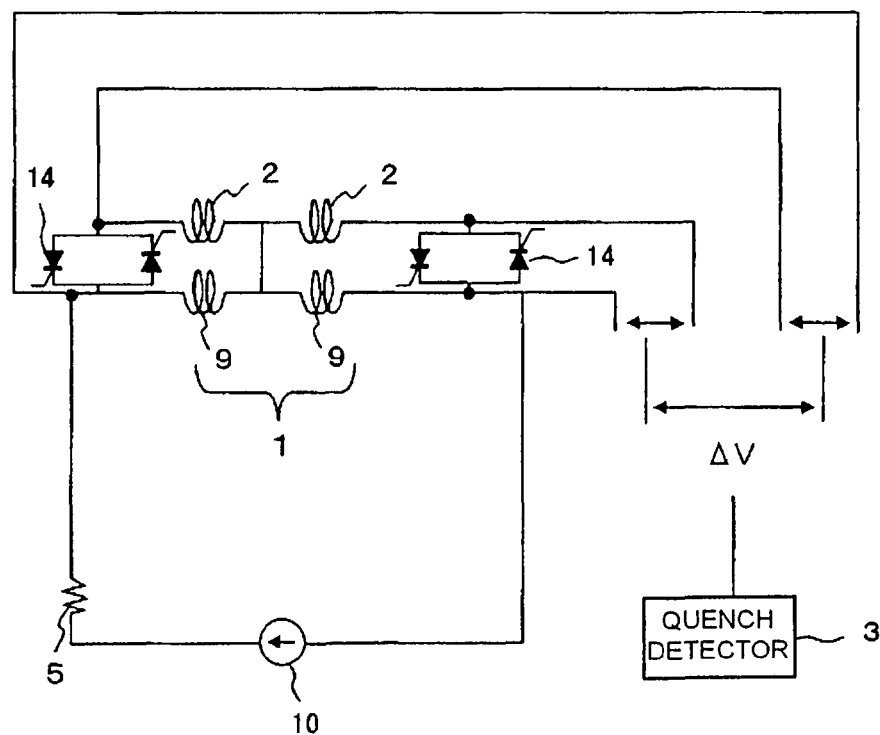

As shown in FIGS. 8 (*a*) and 8 (*b*), the present embodiment has a configuration in which thyristors 14 are connected between the terminals of the superconducting coil 1 and the pick-up coil 2. The thyristors 14 may be GTO thyristors. Alternatively, the thyristors may be replaced by IGBTs or IEGTs, or other elements that can be controlled to open or close. In addition, a plurality of such semiconductor elements may be connected in series or in parallel. In this case, elements of different kinds may be combined.

The present embodiment uses semiconductor elements that can be controlled from the outside to open or close such as the ones described above. Therefore, it is possible to avoid a problem that opening and closing of the semiconductor elements cannot be controlled freely when the semiconductor elements which operate passively are used.

As described above, the present embodiment uses the semiconductor devices that can be controlled from the outside to open or close, therefore it is possible to achieve the quench detection device in which interlock operation of the current source 10 can be set freely.

Ninth Embodiment

Figure 9:
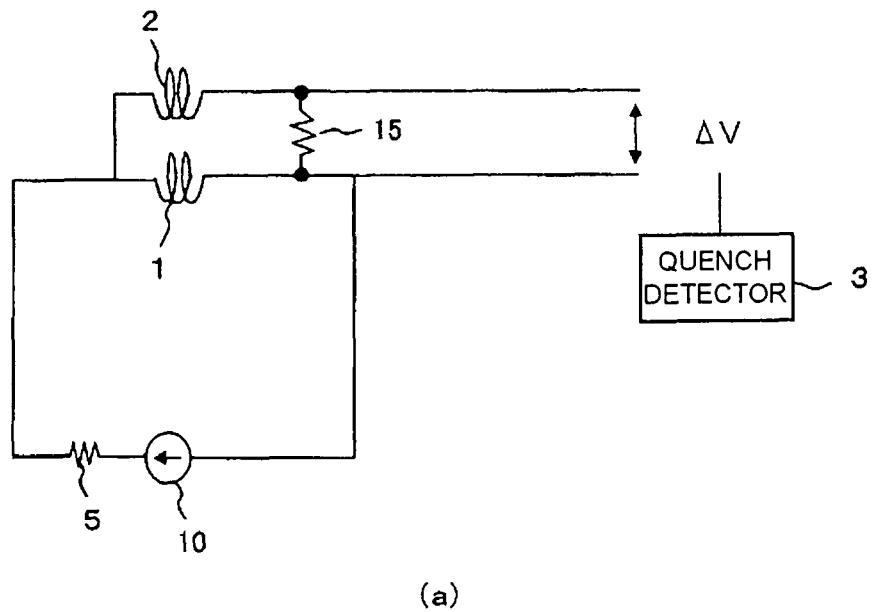
FIG. 9 (a) is a circuit diagram showing the quench detection device of the superconducting coil according to the ninth embodiment of the present invention, and (b) is a circuit diagram of a modification of (a)
Figure 9:
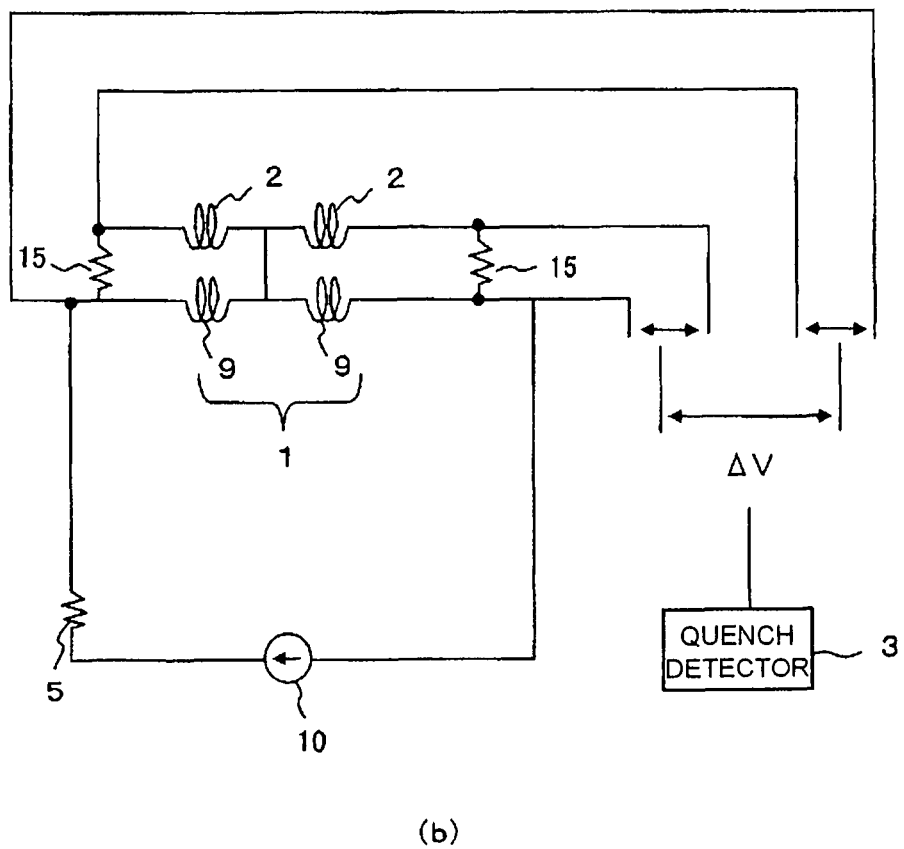

As shown in FIGS. 9 (*a*) and 9 (*b*), the present embodiment has a configuration in which a resistor or resistors 15 is (are) connected between the terminals of the superconducting coil 1 and the pick-up coil(s) 2. A resistance value of the resistor(s) 15 is selected so that the voltage $\Delta V$ generated on both ends of the resistor(s) 15 when the superconducting coil 1 quenches is below 600V.

In the present embodiment, an abnormal signal of the superconducting coil 1 is divided through an impedance of the pick-up coil(s) 2 and the resistor(s) 15, therefore the detecting signal becomes small. However, a high voltage is prevented from being easily input in the quench detector 3. Therefore, it is possible to avoid a problem that taking a special countermeasure against an excess voltage is troublesome in a case where there is no problem even if the abnormal signal becomes small by being divided through resistance.

As described above, in the present embodiment, the abnormal signal from the superconducting coil 1 is divided through the impedance of the pick-up coil(s) 2 and resistance of the resistor(s) 15 and input in the quench detector 3. Therefore, it is possible to achieve the quench detection device that easily prevents a high voltage.

Tenth Embodiment

Figure 10:
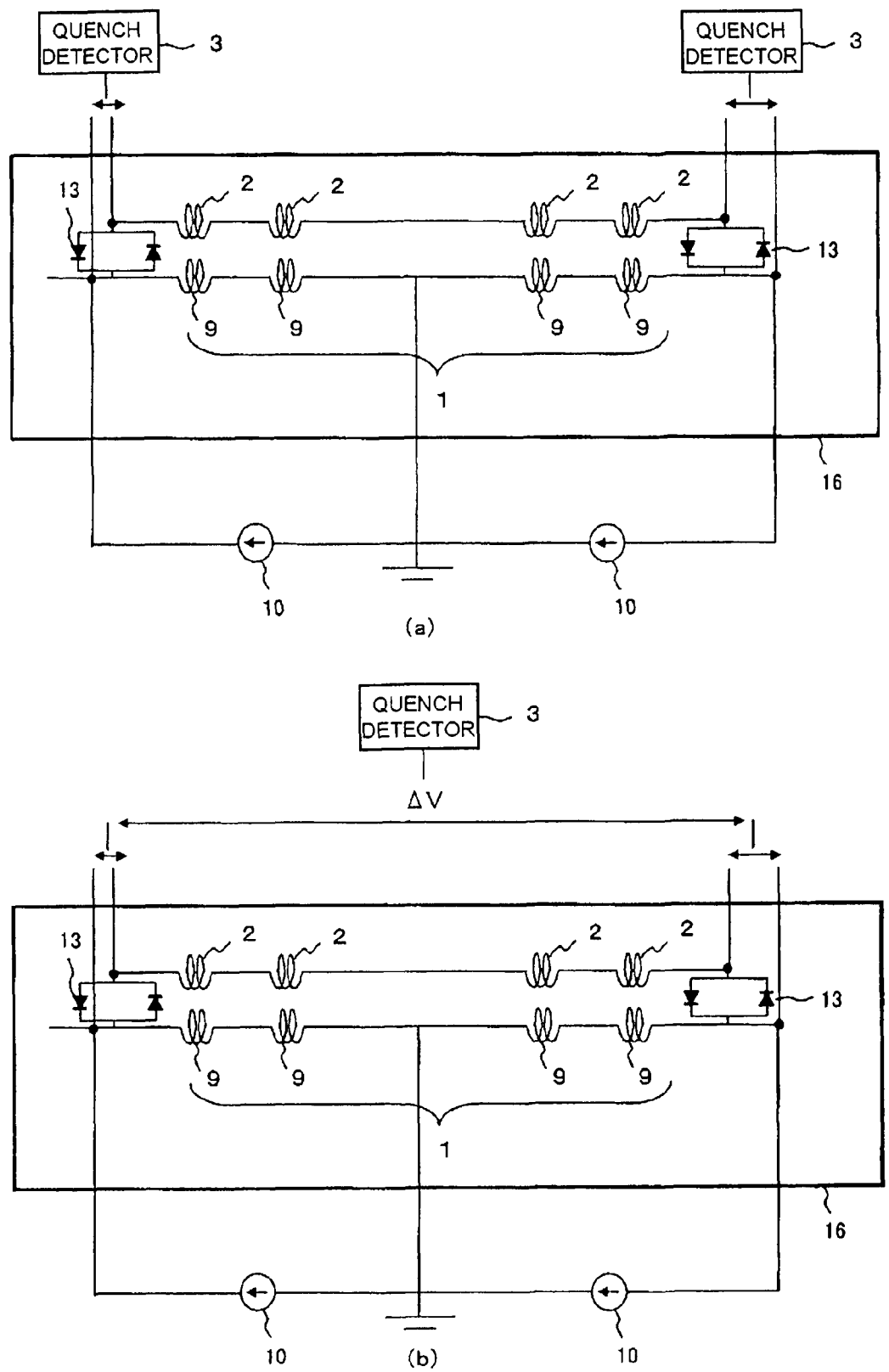
FIG. 10 (a) is a circuit diagram showing a superconducting power storage device including the quench detection device of the superconducting coil according to a tenth embodiment of the present invention, and (b) is a circuit diagram of a modification of (a).

As shown in FIGS. 10 (*a*) and 10 (*b*), in the present embodiment, the superconducting coil 1 configures a superconducting power storage device 16. The superconducting power storage device 16 may be for compensating momentary voltage drop, or may be for controlling a system such as system stabilization and load change compensation or frequency adjustment.

In the present embodiment, the quench detection device according to the first through ninth embodiments is provided in the superconducting power storage device. Therefore, even in a case where a plurality of the element coils are pulse-operated repeatedly or AC operated by a plurality of the current sources, it is possible to avoid a problem that detection of a minute voltage is difficult, and achieve quenching detection with high accuracy.

So far, a variety of embodiments have been described. However, such embodiments are mere exemplification, and the present invention is not limited thereto. In addition, features of the embodiments may be combined in a variety of ways.

The invention claimed is:

1. A quench detection device for a superconducting coil, comprising:
    a pick-up coil provided inside or in a vicinity of the superconducting coil;
    an excess voltage protective circuit that outputs a voltage signal of a predetermined value or smaller after a voltage of a difference between a voltage generated in the superconducting coil and a voltage induced to the pick-up coil is input at a time the superconducting coil quenches; and
    a quench detector that detects quenching of the superconducting coil after the voltage signal is input to the quench detector,
    wherein the pick-up coil is a sub-conductor that is wound in a coil shape to ether with a superconducting wire that forms the superconducting coil.

2. The quench detection device according to claim 1, wherein:
the superconducting coil has a plurality of element coils,
a plurality of the pick-up coils are included corresponding to each of the element coils, and
a voltage difference between different sets of the element coil and the pick-up coil is input in the excess voltage protective circuit.

3. The quench detection device according to claim 1, wherein:
the excess voltage protective circuit has a semiconductor element, and
the semiconductor element is in an open state when quenching is not generated in the superconducting coil, and in a close state when the quenching is generated.

4. The quench detection device according to claim 3, wherein:
the semiconductor element is provided in an inside of a cryostat that contains the superconducting coil.

5. The quench detection device according to claim 1, wherein:
the excess voltage protective circuit is a resistor that is connected between a terminal of the superconducting coil and a terminal of the pick-up coil.

6. A quench detection method of a superconducting coil that detects generation of a resistance component in the superconducting coil by measuring a voltage obtained by canceling an induction component from a voltage generated in the superconducting coil, comprising:
carrying out excess voltage protection so that a maximum value of the voltage to be measured does not exceed a predetermined voltage.

7. The quench detection method of the superconducting coil according to claim 6, wherein:
the predetermined voltage is 600 V.

8. A superconducting power storage device having a quench detection device of a superconducting coil, comprising:
a pick-up coil provided inside or in a vicinity of the superconducting coil;
an excess voltage protective circuit that outputs a voltage signal of a predetermined value or smaller after a voltage of a difference between a voltage generated in the superconducting coil and a voltage induced to the pick-up coil is input at a time the superconducting coil quenches; and
a quench detector that detects quenching of the superconducting coil after the voltage signal is input to the quench detector,
wherein the pick-up coil is a sub-conductor that is wound in a coil shape together with a superconducting wire that forms the superconducting coil.

* * * * *